US007787476B2

(12) United States Patent
Shimizu et al.

(10) Patent No.: US 7,787,476 B2
(45) Date of Patent: Aug. 31, 2010

(54) LAYER 2 SWITCH NETWORK SYSTEM

(75) Inventors: Keiichi Shimizu, Tokyo (JP); Masahiro Kuroda, Tokyo (JP)

(73) Assignees: Mitsubishi Electric Corporation, Tokyo (JP); National Institute of Information and Communications Technology, Incorporated Administrative Agency, Tokyo (JP)

( * ) Notice: Subject to any disclaimer, the term of this patent is extended or adjusted under 35 U.S.C. 154(b) by 727 days.

(21) Appl. No.: 10/591,446

(22) PCT Filed: Mar. 3, 2004

(86) PCT No.: PCT/JP2004/002631

§ 371 (c)(1),
(2), (4) Date: Jun. 26, 2007

(87) PCT Pub. No.: WO2005/086423

PCT Pub. Date: Sep. 15, 2005

(65) Prior Publication Data

US 2007/0280207 A1    Dec. 6, 2007

(51) Int. Cl.
*H04L 12/28* (2006.01)
(52) U.S. Cl. .................. 370/401; 370/331; 370/389; 370/352
(58) Field of Classification Search .................. None
See application file for complete search history.

(56) References Cited

U.S. PATENT DOCUMENTS 6,160,804 A    12/2000  Ahmed et al.

7,634,230 B2 *  12/2009  Ji et al. .................. 455/41.2
2003/0177267 A1  9/2003  Orava et al.
2005/0174998 A1 *  8/2005  Vesterinen et al. .......... 370/354

FOREIGN PATENT DOCUMENTS

JP       11-27310 A       1/1999

(Continued)

OTHER PUBLICATIONS

J. Chen et al., Fast Link Layer and Intra-Domain Handoffs for Mobile Internet, Computer Software and Applications Conference, 2000, COMPSAC 2000, The 24th Annual International Taipei, Taiwan Oct. 25-27, 2000, Los Alamitos, CA, USA, IEEE Comput. Soc., US, pp. 325-330, Oct. 25, 2000.

(Continued)

*Primary Examiner*—Duc C Ho
(74) *Attorney, Agent, or Firm*—Birch, Stewart, Kolasch, and Birch, LLP

(57) ABSTRACT

A layer 2 switch network system includes a terminal, an edge switch, and a Radius server that notifies the edge switch of a temporary MAC address allocated to the terminal. The edge switch stores therein swap data for associating the temporary MAC address with a real MAC address. When receiving a MAC frame from the terminal, the edge switch replaces the real MAC address of a source set in the MAC frame with the temporary MAC address of the source. When transmitting a MAC frame to the terminal, the edge switch replaces the temporary MAC address of a destination set in the MAC frame with the real MAC address of the destination.

20 Claims, 13 Drawing Sheets

FOREIGN PATENT DOCUMENTS

| | | |
|---|---|---|
| JP | 3132426 B2 | 11/2000 |
| JP | 2003-229871 A | 8/2003 |
| JP | 2004-48260 A | 2/2004 |
| WO | WO-00/36794 A1 | 6/2000 |

OTHER PUBLICATIONS

C. Perkins, IP Mobility Support, IETF RFC2002, pp. 8-11.

D. Johnsin et al., Mobility Support in IPv6, IETF Internet Draft, pp. 15-19, draft-itef-mobileip-ipv6-24.txt.

Masahiro Kuroda et al., A study of Scalable Layer 2 Mobility Network, IPSJ SIG Technical Report, MBL-26(3).

Kaouthar Sethom et al., Adaption Interface of Seamless Hndover between 802.220MBWA/802.11/802.15 C802.20-03-104.

* cited by examiner

LAYER 2 SWITCH NETWORK SYSTEM

TECHNICAL FIELD

The present invention relates to a layer 2 switch network system that uses a temporary MAC address.

BACKGROUND ART

In a heterogeneous wireless integrated network that includes a mobile terminal including a plurality of types of wireless access interfaces, a method has been proposed to seamlessly switch the wireless access interfaces used by the mobile terminal.

If an IP sub network is changed by switching of the wireless access interfaces, then an IP address used by a mobile terminal is changed with the movement of the mobile terminal, and a communication session is disconnected. In this case, the communication session can be held by a Mobile IP (Non-Patent Literatures 1 and 2).

If the Mobile IP is used, a real IP address (care-of address) is allocated to each interface of the mobile terminal. In addition, an IP address (home address) common to all the interfaces is allocated to each interface of the mobile terminal.

A communication-partner terminal identifies the mobile terminal based on the home address of the mobile terminal, and a home agent in an IP network converts the home address to the care-of address or vice versa. According to Mobile Internet Protocol version 6 (IPv6), the mobile terminal constantly notifies the communication-partner terminal of update of correspondence between the home address and the care-of address so that the communication-partner terminal converts the home address to the care-of address.

Meanwhile, the roaming from one IP sub network to another causes a change in IP address, so that high-speed movement cannot be substantially realized. By contrast, movement of a terminal within the IP sub network causes no change in IP address, so that high-speed movement can be realized. Considering these, a network configuration has been proposed, in which each IP sub network is extended as widely as possible and a plurality of heterogeneous wireless access points are accommodated in one IP sub network (Non-Patent Literature 3). According to the Non-Patent Literature 3, at the time of switching of interfaces (hereinafter, "interface switching"), the terminal requests each of the network and the communication-partner terminal to update a correspondence table between a media access control (MAC) address and an IP address.

If the IP sub network is not changed by the interface switching, the network can be configured so that the IP address used by the mobile terminal is not changed according to the movement of the mobile terminal. Such an unchanged IP address is referred to as "common IP address". A technique has been proposed, in which virtual interfaces obtained by virtualizing a plurality of interfaces each allocated the common IP address are defined to obscure the interfaces switching from a higher application (Non-Patent Literature 4).

Although unrelated to the heterogeneous wireless integrated network, a technique has been proposed to accelerate intranetwork switching speed (Patent Document 1). In such a technique, a layer 2 switch manages not only a real MAC address of each terminal interface but also a temporary MAC address of each terminal interface compressed to have fewer bits sufficient to identify the terminal interface accommodated in the network. When a layer 2 edge switch transmits or receives a MAC frame, intranetwork switching of the interfaces can be performed based on the bit-compressed temporary MAC address by replacement between the real MAC address and the temporary MAC address.

Non-Patent Literature 1: C. Perkins, "IP Mobility Support" IETF RFC2002, 1996/10, pp. 8-11

Non-Patent Literature 2: D. Johnson et al., "Mobility Support in IPV6" IETF Internet Draft draft-ietf-mobileip-ipv6-24.txt, 2003/6, pp. 15-19

Non-Patent Literature 3: Masahiro Kuroda et al., "Study of Layer 2 Mobility Network", IPSJ (Information Processing Society of Japan) Technical Report, MBL-26 (3), Sep. 25, 2003

Non-Patent Literature 4: Kaouthar Sethom et al., "Adaptation Interface for Seamless Handover between 802.20 MBWA/802.11/802.15", C802.20-03-104

Patent Document 1: Japanese Patent No. 3132426 (Japanese Patent Application Laid-Open No. 11-27310)

However, if the interface switching of the mobile terminal in the heterogeneous wireless integrated IP network is controlled by the Mobile IP as disclosed in the Non-Patent Literatures 1 and 2, the real IP address (care-of address) of each interface is changed by the movement of the mobile terminal. To obscure the change, the concept of a home address is necessary, and someone or some mechanism has to manage correspondence between the home address and the care-of address. If the home agent is responsible for the management, a communication from the communication-partner terminal to the mobile terminal is basically held through the home agent. This disadvantageously causes packet delay, deterioration of band efficiency, and packet loss. On the other hand, if the communication-partner terminal directly manages the correspondence, it is disadvantageously necessary for the communication-partner terminal to directly recognize complicated Mobile-IP signaling procedures. Various extending methods have been proposed for the mobile IP to prevent packet delay, improve band efficiency, and prevent packet loss. However, these methods force the terminal to exercise further complicated signaling control.

As disclosed in the Non-Patent Literature 3, the interface switching within the IP subnetwork can be processed at high speed. However, the terminal needs to occasionally notify the network or the communication-partner terminal of the change of the MAC address. A time lag in the notification causes IP packet loss. Moreover, it is difficult to protect the security of the notification from one mobile terminal to another, so that the notification is vulnerable to DoS attack.

According to the Non-Patent Literature 4, the interface switching is obscured against the higher application using the concept of the virtual interfaces. However, the actually used interfaces are independent of one another. Due to this, during an actual communication, the communication is held using the MAC address allocated to each interface. Generally, the MAC address used for communication is cached by the communication-partner terminal. Therefore, if the interface switching is performed, the communication-partner terminal temporarily transmits a MAC frame to the MAC address of a previously-used (hereinafter, "old") interface. If the old interface is unavailable, the terminal discards the MAC frame.

The technique disclosed in the Patent Document 1 completely differs in object from the present invention. The technique does not at all support the object of the present invention, i.e., handling of the mobile terminal and the interface switching. Additionally, the disclosure does not mention a method of allocating the temporary MAC address to the terminal safely and dynamically. Due to this, it is difficult to actually use the technique. Moreover, the technique does not at all overcome the problem of MAC level DoS attack solved by the present invention. Furthermore, the disclosure suggests a mechanism in which the layer 2 switch replies the temporary MAC address relative to the IP address. However, it is difficult to construct such an unordinary layer 2 switch.

It is therefore an object of the present invention to achieve a layer 2 switch network system capable of safely providing a high-speed interface-switching mechanism in a layer 2 switch network.

DISCLOSURE OF INVENTION

A layer 2 switch network system according to the present invention accommodates a terminal, and a plurality of layer 2 switches including an edge switch that is located at an edge of a network and serves as a wireless access point, the layer 2 switch network system, and includes a temporary-MAC-address notifying unit that notifies the edge switch of a temporary MAC address allocated to the terminal. The edge switch acquires a temporary MAC address corresponding to the terminal from the temporary-MAC-address notifying unit, and stores therein swap data which associates the acquired temporary MAC address with a real MAC address. When receiving a MAC frame from the terminal, the edge switch converts a real MAC address of a source set in a MAC frame to a temporary MAC address of the source. When transmitting a MAC frame to the terminal, the edge switch converts a temporary MAC address of a destination set in the MAC frame to a real MAC address of the destination.

According to the present invention, the communication between the edge switch and the terminal is basically held based on the real MAC addresses. The communication in the layer 2 network including the edge switch is basically held based on the temporary MAC addresses. It is thereby possible to safely provide a high-speed interface-switching network.

BEST MODE (S) FOR CARRYING OUT THE INVENTION

Exemplary embodiments of the present invention will be explained hereinafter with reference to the accompanying drawings.

First Embodiment

Figure 1:
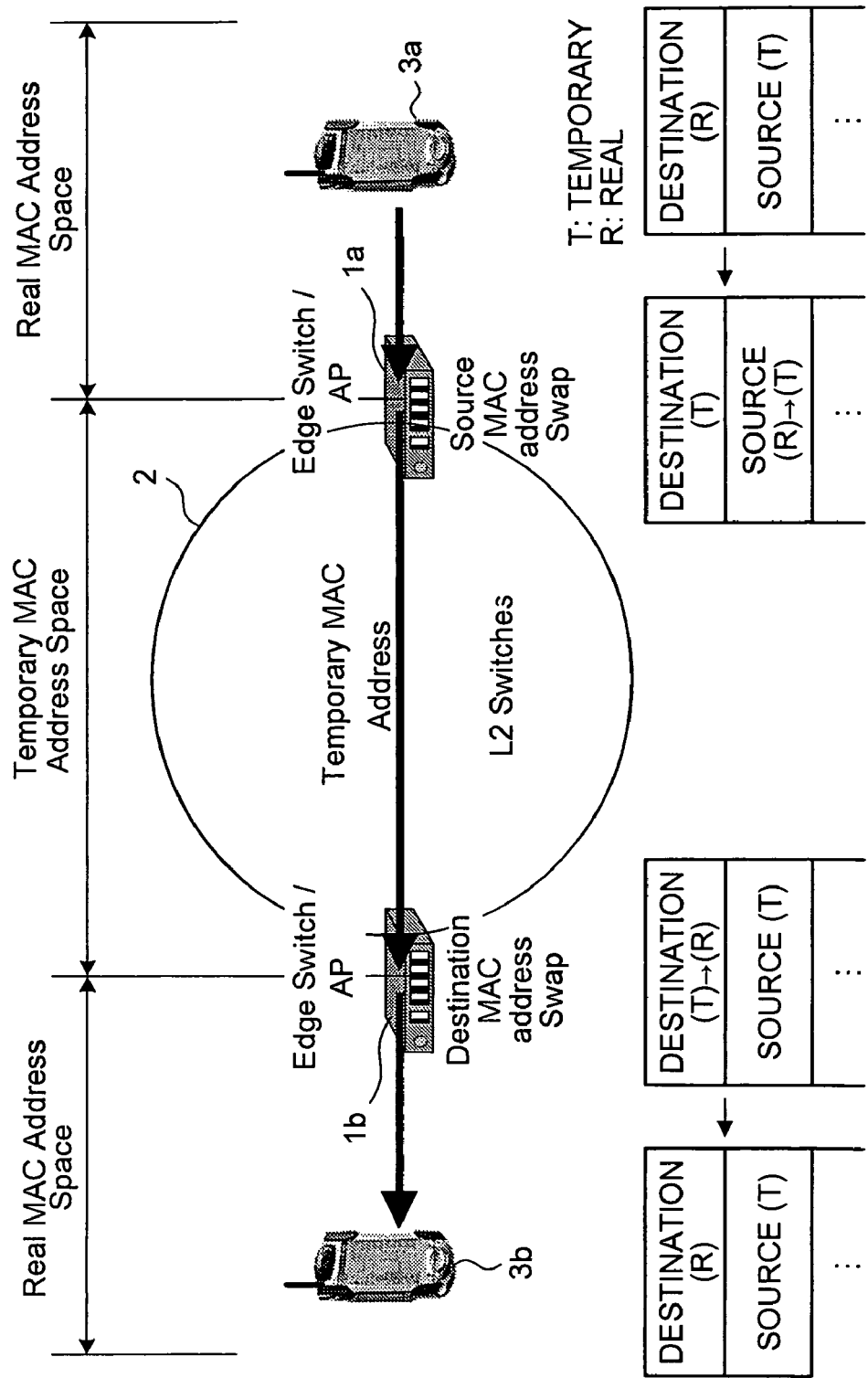
FIG. 1 is a schematic of a system configuration and a flow of a MAC frame according to a first embodiment.

FIG. 1 is a conceptual schematic of a network according to a first embodiment of the present invention. In FIG. 1, reference symbols 1a and 1b denote layer 2 switches accommodating a plurality of wired or wireless terminals 3a and 3b or wireless access points each including a function of the layer 2 switch and located on respective edges of the network. The layer 2 switches or wireless access points 1a and 1b will be referred to as "edge switches", hereinafter. Reference symbol 2 denotes a layer 2 network constituted by the layer 2 switches including the edge switches 1a and 1b. Reference symbol 3a denotes a terminal that transmits a MAC frame, and 3b denotes a communication-partner terminal that communicates with the terminal 3a. As the terminals 3a and 3b, mobile terminals or fixed terminals can be used.

In FIG. 1, communication between the edge switch 1a and the terminal 3a and that between the edge switch 1b and the terminal 3b is held based on a real MAC address allocated to an interface included in the terminal 3a or 3b (to be exact, the communication between the edge switch and the terminal is held based on a temporary MAC address as well as the real MAC address). Communication within the layer 2 network 2 including the edge switches 1a and 1b is held based on the temporary MAC address. Due to this, each of the edge switches 1a and 1b of the layer 2 networks 2 makes a replacement between the real MAC address and the temporary MAC address. The temporary MAC address is a MAC address compressed to have fewer bits sufficient to identify the terminal interface accommodated in the layer 2 networks 2.

Figure 2:
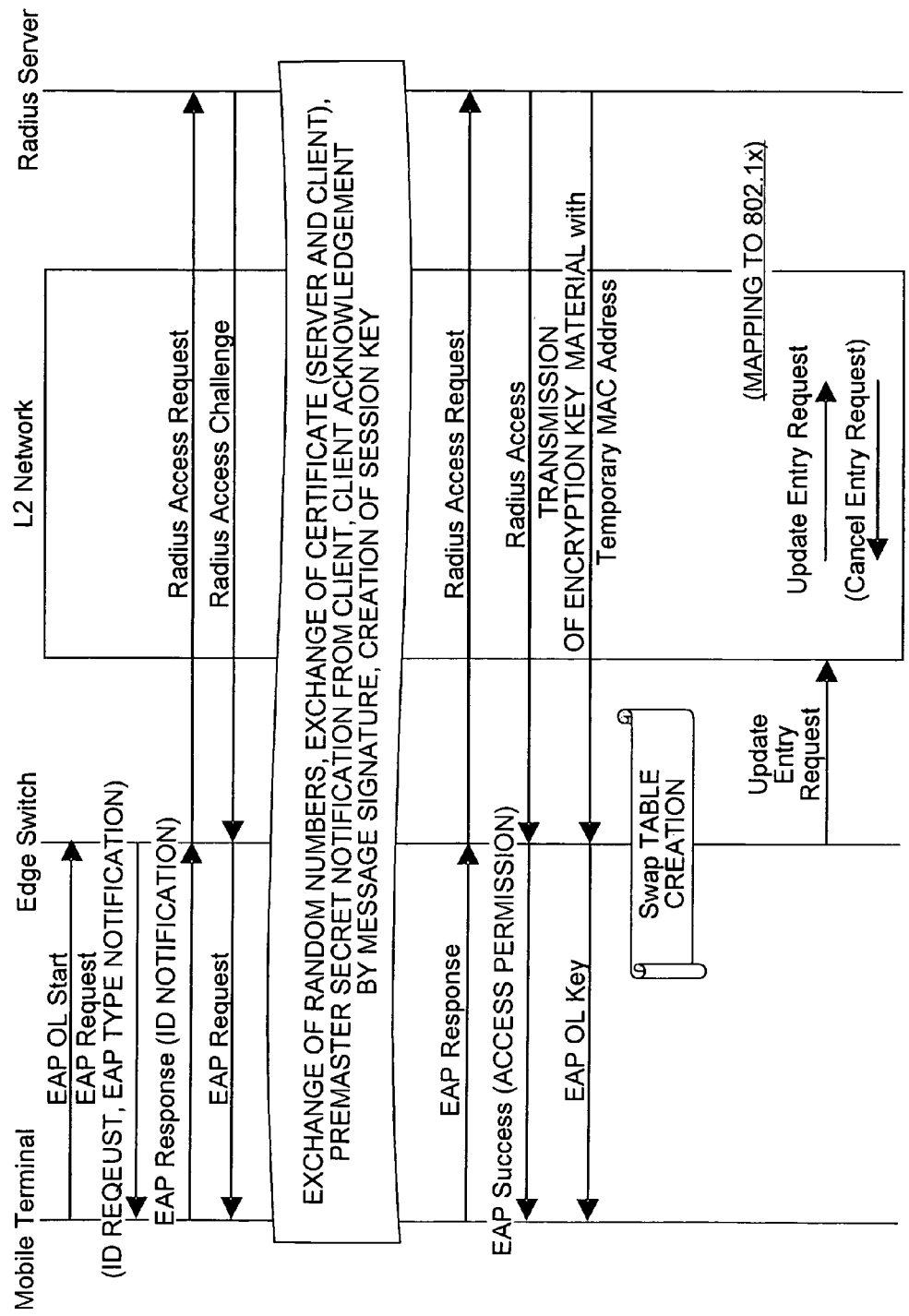
FIG. 2 is a signal flowchart of operations performed by respective constituents according to the first embodiment.

FIG. 2 is a flowchart for explaining a method of allocating the temporary MAC address to the terminal. An allocation operation will be explained with reference to FIG. 2. In the first embodiment, the allocation of the temporary MAC address is synchronized with an authentication flow. FIG. 2 depicts, in particular, an example in which the allocation of the temporary MAC address is synchronized with the authentication flow according to Institute of Electrical and Electronics Engineers (IEEE) 802.1x.

When the terminal 3a accesses the edge switch 1a such as a wireless LAN access point, the terminal 3a transmits EAPOL Start (Extensible Authentication Protocol over LAN start) to the edge switch 1a to start an authentication phase, that is, an authentication negotiation. In response to the EAPOL Start, the edge switch 1a transmits EAP Request to the terminal 3a to indicate the terminal 3a which type of authentication (electronic signature, fixed password, etc.) is to be used. The terminal 3a notifies the edge switch 1a of an ID of the terminal 3a by transmitting EAP Response in response to the EAP Request. In response to the notification, the edge switch 1a initiates, for example, a Challenge-Response authentication using a Radius (Remote Authentication Dial-In User Services) server as an authentication server responsible for the allocation of the temporary MAC address.

In the authentication phase, exchange of random numbers, exchange of certificates between the client and the server, notification of premaster secret from the client, client acknowledgment by message signature, session-key creation and the like are executed.

When the Radius server completes the authentication, the Radius server notifies the edge switch 1a of completion of the authentication and dynamically allocates the temporary MAC address for uniquely identifying the terminal 3a to the terminal 3a. Besides, the Radius server notifies the edge switch 1a of the temporary MAC address as well as information such as a key used for wireless encryption. Namely, the Radius server completes the authentication without particularly identifying the terminal using the MAC address or the like, and then generates the unique temporary MAC address and notifies the edge switch 1a of the temporary MAC address. It is to be noted that transmission of the temporary MAC address is terminated at the edge switch 1a but that the encryption key or the like is transmitted up to the terminal 3a by EAP OL Key.

The edge switch 1a regards the real MAC address used when the terminal 3a accesses the edge switch 1a and the notified temporary MAC address as authenticated MAC addresses. In addition, the edge switch 1a creates swap data including data on correspondence between the real MAC address and the temporary MAC address, and registers the created swap data in a swap table. The correspondence information (swap data) between the real MAC address and the temporary MAC address is used for replacement (swapping) of the MAC addresses during subsequent transmission and reception of the MAC frame.

After creating the swap table, the edge switch 1a performs processing for updating a correspondence table between the temporary MAC address and an output port learned by each layer 2 switch in the layer 2 networks 2. For example, the edge switch 1a transmits a message such as Update Entry Request to each layer 2 switch in the layer 2 networks 2, thereby updating the correspondence table between the temporary MAC address and the output port. The terminal 3a can transmit the MAC frame after carrying out the authentication procedures.

FIG. 1 also depicts an operation concept during transmission of the MAC frame. To transmit the MAC frame to the terminal 3b, the terminal 3a generates the MAC frame with a temporary MAC address of the terminal 3b set as a destination address and the real MAC address of the terminal 3a set as a source address. The terminal 3a transmits the generated MAC frame to the edge switch 1a.

When transmitting the MAC frame, the terminal 3a designates the temporary MAC address as the destination address for the following reason. Generally, the terminal includes a function of caching a correspondence table between an IP address and a MAC address of the communication-partner terminal. As explained later, when the MAC frame is transmitted from the edge switch to the terminal, the source address (communication-partner terminal address) is designated using the temporary MAC address, and the destination address (terminal address) is designated using the real MAC address. Accordingly, each terminal caches the MAC address which is actually the temporary MAC address of the communication-partner terminal assuming that the temporary MAC address is the real MAC address of the communication-partner terminal.

Upon receiving the MAC frame from the terminal 3a, the edge switch 1a searches the temporary MAC address of the source terminal 3a from the information stored therein with the real MAC address of the source terminal 3a as a key. After replacing the source address by the temporary MAC address of the source (without doing anything about the destination address), the edge switch 1a transmits the MAC frame according to ordinary procedures for the layer 2 switching. The MAC frame is transmitted to the edge switch 1b according to the ordinary procedures for the layer 2 switching.

The edge switch 1b obtains the real MAC address of the destination terminal 3b from the information stored therein with the temporary MAC address of the destination terminal 3b as a key. After replacing the destination address by the real MAC address of the destination (without doing anything about the source address), the edge switch 1b transmits the MAC frame to the terminal 3b according to the ordinary procedures for the layer 2 switching.

As described above, according to the first embodiment, the authentication server (Radius server) dynamically allocates the temporary MAC address to the edge switch synchronously with the authentication procedures. It is, therefore, possible to safely and simply use the temporary MAC address.

In the first embodiment, the authentication server (Radius server) transmits the temporary MAC address. Alternatively, an arbitrary server belonging to the network 2 can generate the temporary MAC address. For example, the edge switch itself can allocate the temporary MAC address to the terminal. The temporary MAC address can also be allocated to the terminal by identifying the terminal with the real MAC address. All network equipment that generates the temporary MAC address allocated to each terminal will be generically referred to as "temporary-MAC-address transaction servers".

Second Embodiment

Figure 3:
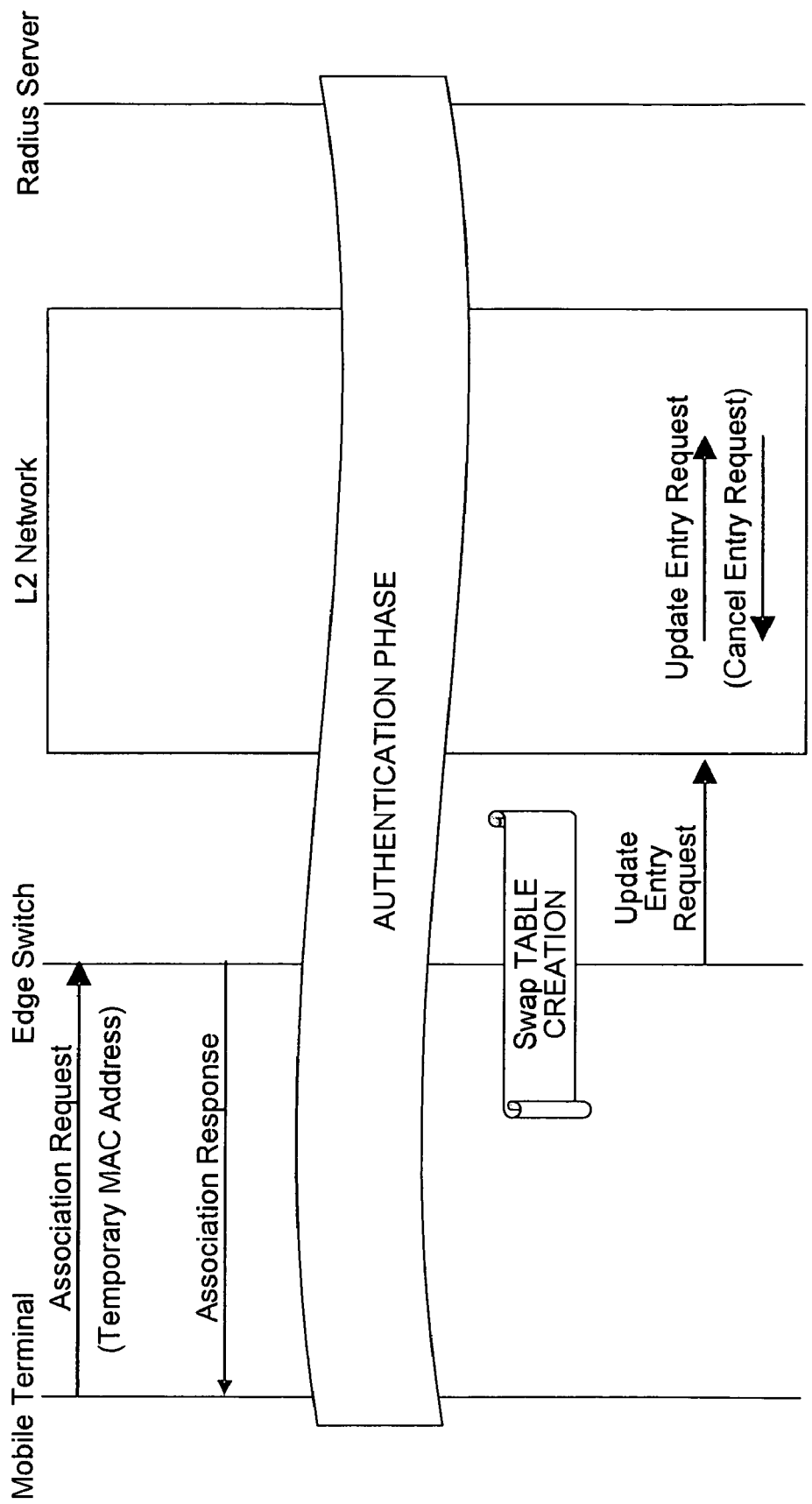
FIG. 3 is a signal flowchart of operations performed by respective constituents according to a second embodiment.

FIG. 3 is a sequence diagram for explaining an example of the allocation of the temporary MAC address when the terminal is responsible for the allocation of the temporary MAC address.

In this case, it is assumed that the terminal is allocated a network-unique temporary MAC address in advance at the time of contract or the like, and that the terminal holds the temporary MAC address.

For example, if the terminal is to establish an association with the edge switch such as the wireless LAN access point, the terminal notifies the edge switch of the temporary MAC address of the terminal during association procedures. In FIG. 3, when the terminal transmits an association request (association Request) to the edge switch, the terminal notifies the edge switch of the temporary MAC address of the terminal. Normally, authentication procedures are carried out when the terminal accesses the edge switch for the first time. Therefore, at the time of completion of the authentication procedures, the correspondence table (swap table) between the real MAC address and the temporary MAC address is created in the edge switch.

After creation of the swap table, the edge switch 1a transmits such a message as Update Entry Request to each layer 2 switch in the layer 2 networks 2 similarly to the first embodiment. The edge switch 1a thereby updates the correspondence table between the temporary MAC address and the output port for the MAC frame, which is addressed to the temporary MAC address, learned by each layer 2 switch in the layer 2 networks 2. After the procedures, the terminal 3a can transmit the MAC frame. The subsequent operation for transmitting and receiving the MAC frame is the same as that according to the first embodiment.

As described above, according to a second embodiment, the terminal holds a temporary MAC address dynamically allocated thereto, and notifies the edge switch in the network of the temporary MAC address. It is, therefore, possible to use the temporary MAC address more easily.

Third Embodiment

Figure 4:
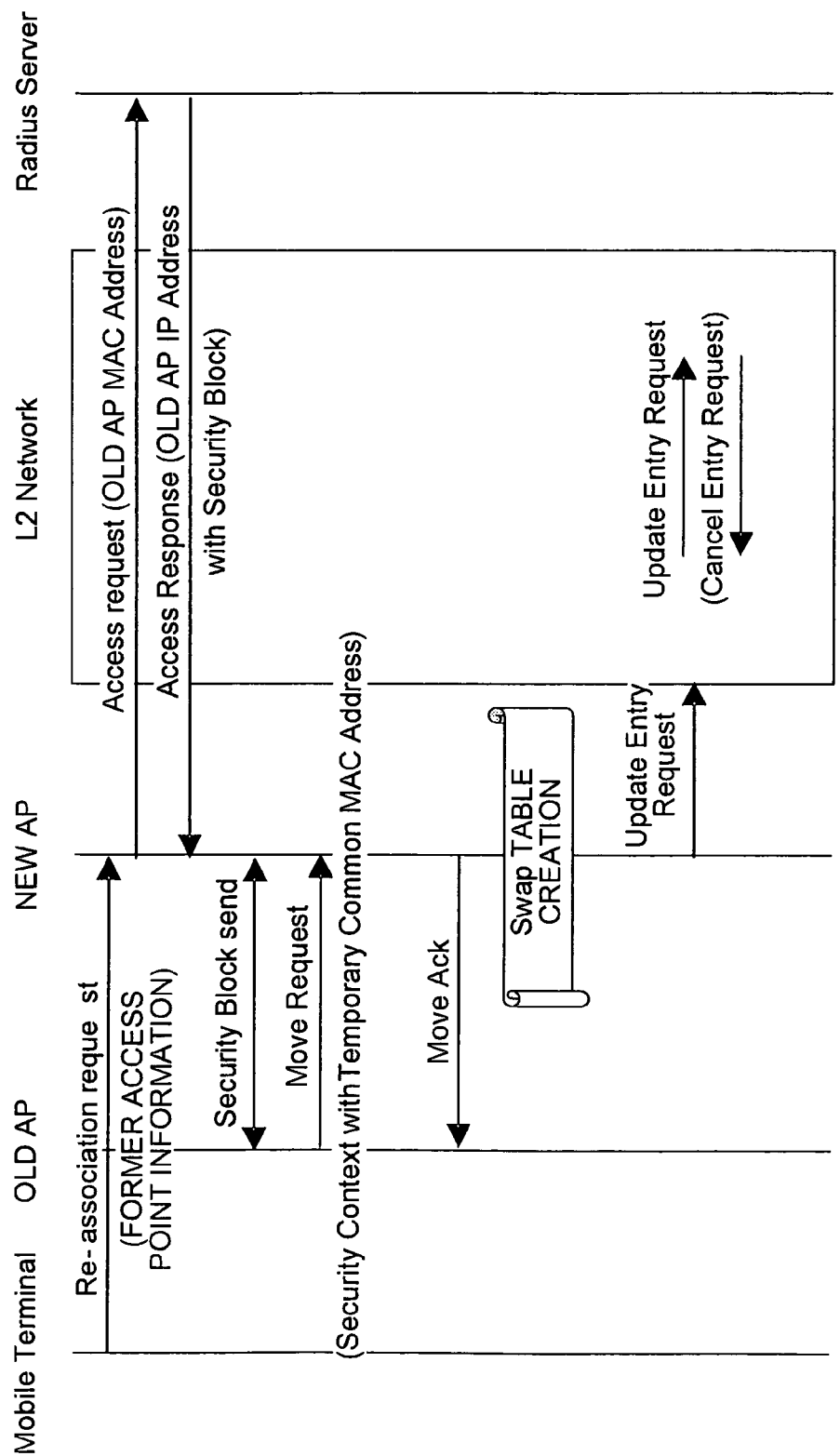
FIG. 4 is a signal flowchart of operations performed by respective constituents according to a third embodiment.

FIG. 4 is a flowchart for explaining change of wireless access points to access a network caused by the movement of the mobile terminal between wireless access points as edge switches or by switching of wireless interfaces to be used. The flow is based on, for example, roaming between wireless access points called IAPP (Inter-Access Point Protocol) defined in IEEE 802.11f. A third embodiment is applicable to the first or second embodiment.

As shown in FIG. 4, it is assumed that the mobile terminal moves from a previously-used (hereinafter, "old") wireless access point (OLD AP) to a presently-used (hereinafter, "new") wireless access point (NEW AP). It is also assumed that the mobile terminal makes reassociation setting with the new wireless access point (transmits RE-association request to the new wireless access point). At the time of the reassociation setting, the mobile terminal notifies the new wireless access point of information on the old access point including the MAC address (real MAC address) of the old access point. At the time of the reassociation setting, the new access point acquires an IP address of the access point before the movement of the mobile terminal using the Radius server according to the IEEE 802.11f. Namely, when the new access point transmits Access request including the MAC address of the old access point to the Radius server, the Radius server transmits the IP address of the old access point corresponding to the MAC address of the old access point to the new access point.

The new access point transfers security information such as an encryption key to the old access point using the acquired IP address of the old access point. The old access point transmits the correspondence table between the temporary MAC address and the real MAC address of the mobile terminal together with the security information to the new access point as a Move Request. When receiving the Move Request, the new access point transmits Move Ack to the old access point. In addition, the new access point creates or updates the correspondence table (swap table) between the real MAC address and the temporary MAC address of the mobile terminal without re-authentication.

After creating the swap table, the new access point serving as the edge switch transmits such a message as Update Entry Request to each layer 2 switch in the layer 2 networks similarly to the first embodiment. The new access point thereby updates the correspondence table between the temporary MAC address and the output port learned by each layer 2 switch in the layer 2 networks 2.

Alternatively, it is possible to predict the movement of the mobile terminal, and transmit and receive information on the temporary MAC address between the access points before and after the movement of the mobile terminal.

If the terminal is responsible for the allocation of the temporary MAC address as in the second embodiment, when establishing an association with a new access point after moving to the new access point, the mobile terminal notifies the new access point of the temporary MAC address of the mobile terminal. Thus, the correspondence table (swap table) between the real MAC address and the temporary MAC address can be created in the new access point.

As described above, according to the third embodiment, the access point after the movement of the terminal takes over information on the temporary MAC address from the access point before the movement of the terminal. It is, therefore, possible to realize high speed handover without the need of authentication after movement or the like.

Fourth Embodiment

Figure 5:
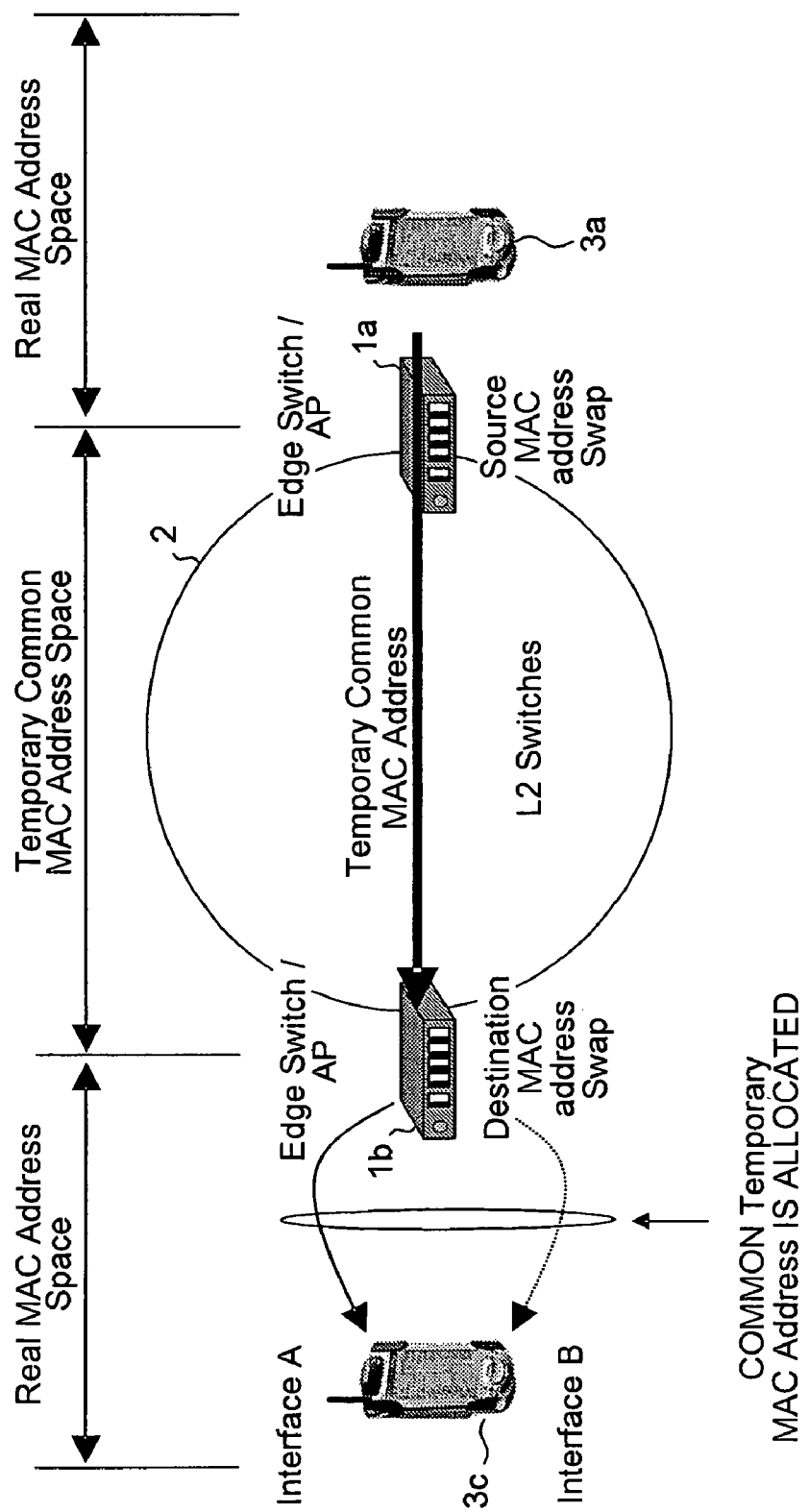
FIG. 5 is a schematic of a system configuration according to a fourth embodiment.

FIG. 5 is a schematic for explaining an example in which the interface switching of the mobile terminal is performed in a heterogeneous wireless integrated IP network using the temporary MAC address. In FIG. 5, a mobile terminal 3c includes a plurality of terminal interfaces (wireless interfaces such as IF.wlan, IF.wcdma, and wireless LAN) each having a common IP address. In addition, the mobile terminal 3c is allocated different real MAC addresses according to the respective terminal interfaces.

As shown in FIG. 5, a fourth embodiment is characterized in that the different real MAC addresses allocated to the respective terminal interfaces are associated with the same temporary MAC address. For example, if the temporary-MAC-address transaction server such as the Radius server serving as the authentication server in the network 2 or the edge switch allocates the temporary MAC address to each terminal interface of the mobile terminal 3c, the temporary MAC address allocated in a first authentication phase is used by the respective terminal interfaces.

Figure 6:
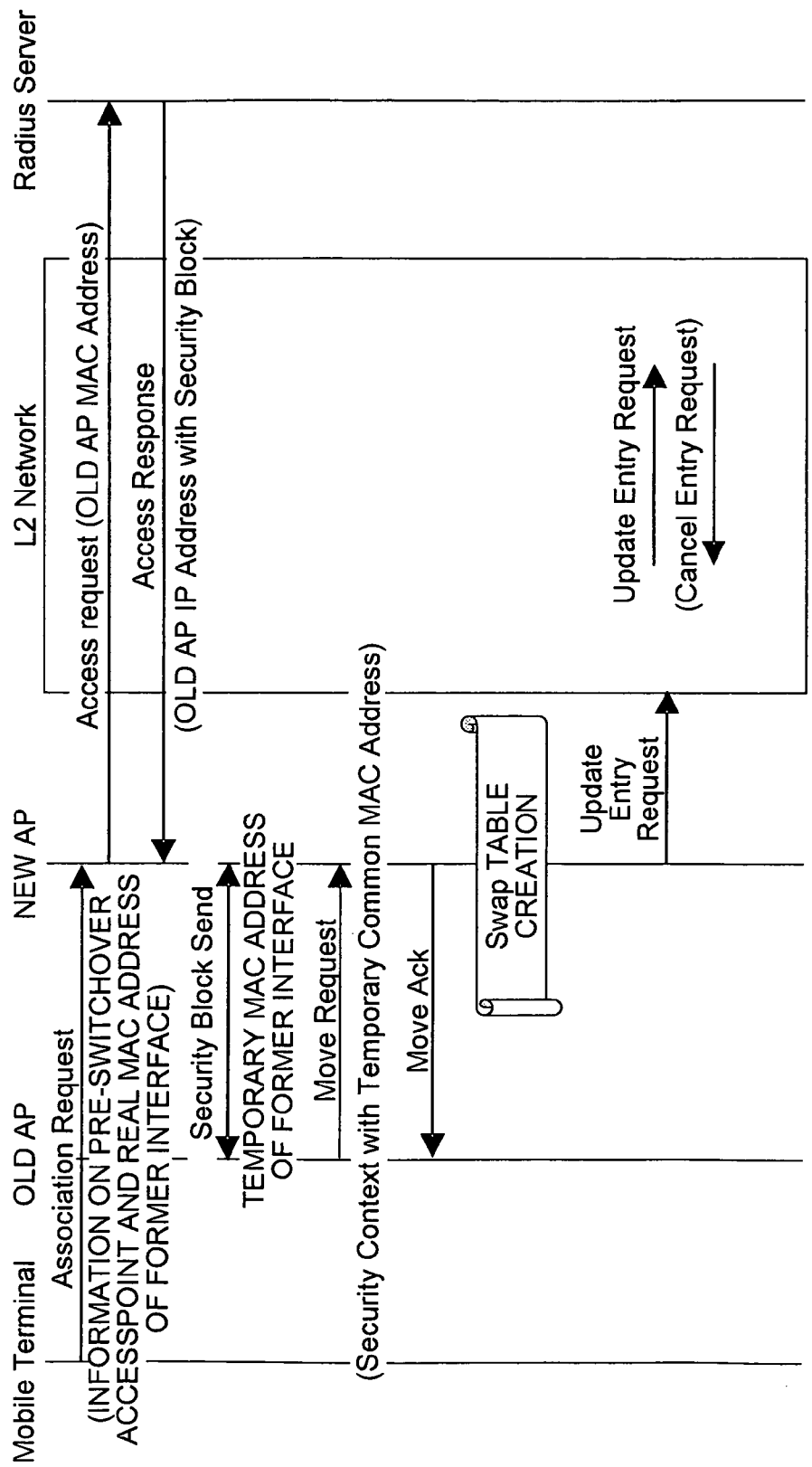
FIG. 6 is a signal flowchart of operations performed by respective constituents according to the fourth embodiment.

FIG. 6 is a flowchart of an example of operation for the interface switching. It is assumed, for example, that the mobile terminal 3c performs the interface switching, and establishes an association with the new access point (NEW AP). If so, the mobile terminal 3c transmits information (including the MAC address of the old access point or the like) on the old access point (OLD AP) before the interface switching and the real MAC address of the old interface before the interface switching to the new access point simultaneously with the establishment of the association.

Similarly to the third embodiment, the new access point transmits Access request including the MAC address of the old access point to the Radius server. The Radius server transmits the IP address of the old access point corresponding to the received MAC address of the old access point to the new access point.

The new access point transfers the security information such as the encryption key to the old access point using the acquired IP address of the old access point. The old access point transmits the correspondence table between the temporary MAC address and the real MAC address of the mobile terminal to the new access point simultaneously with transmission of the security information as Move Request. When receiving the Move Request, the new access point transmits Move Ack to the old access point. In addition, the new access point creates or updates the correspondence table (swap table) between the real MAC address and the temporary MAC address of the mobile terminal without re-authentication.

After creating the swap table, the new access point serving as the edge switch transmits such a message as Update Entry Request to each layer 2 switch in the layer 2 networks similarly to the first embodiment. The new access point thereby updates the correspondence table between the temporary MAC address and the output port learned by each layer 2 switch in the layer 2 networks 2.

Alternatively, it is possible to predict the movement of the mobile terminal, and transmit and receive information on the temporary MAC address between the access points before and after the movement of the mobile terminal.

If the terminal is responsible for the allocation of the temporary MAC address as in the second embodiment, when establishing an association with a new access point after moving to the new access point or switching the interfaces, the mobile terminal notifies the new access point of the temporary MAC address common to the interfaces. Thus, the correspondence table between the real MAC address and the temporary MAC address can be created in the new access point.

As described above, according to the fourth embodiment, the common temporary MAC address is shared among the respective terminal interfaces. It is thereby possible to obscure the interface switching within the network or from the communication partner, and realize high-speed handover with smaller loss or delay of the MAC frame and less signaling load.

Fifth Embodiment

Figure 7:
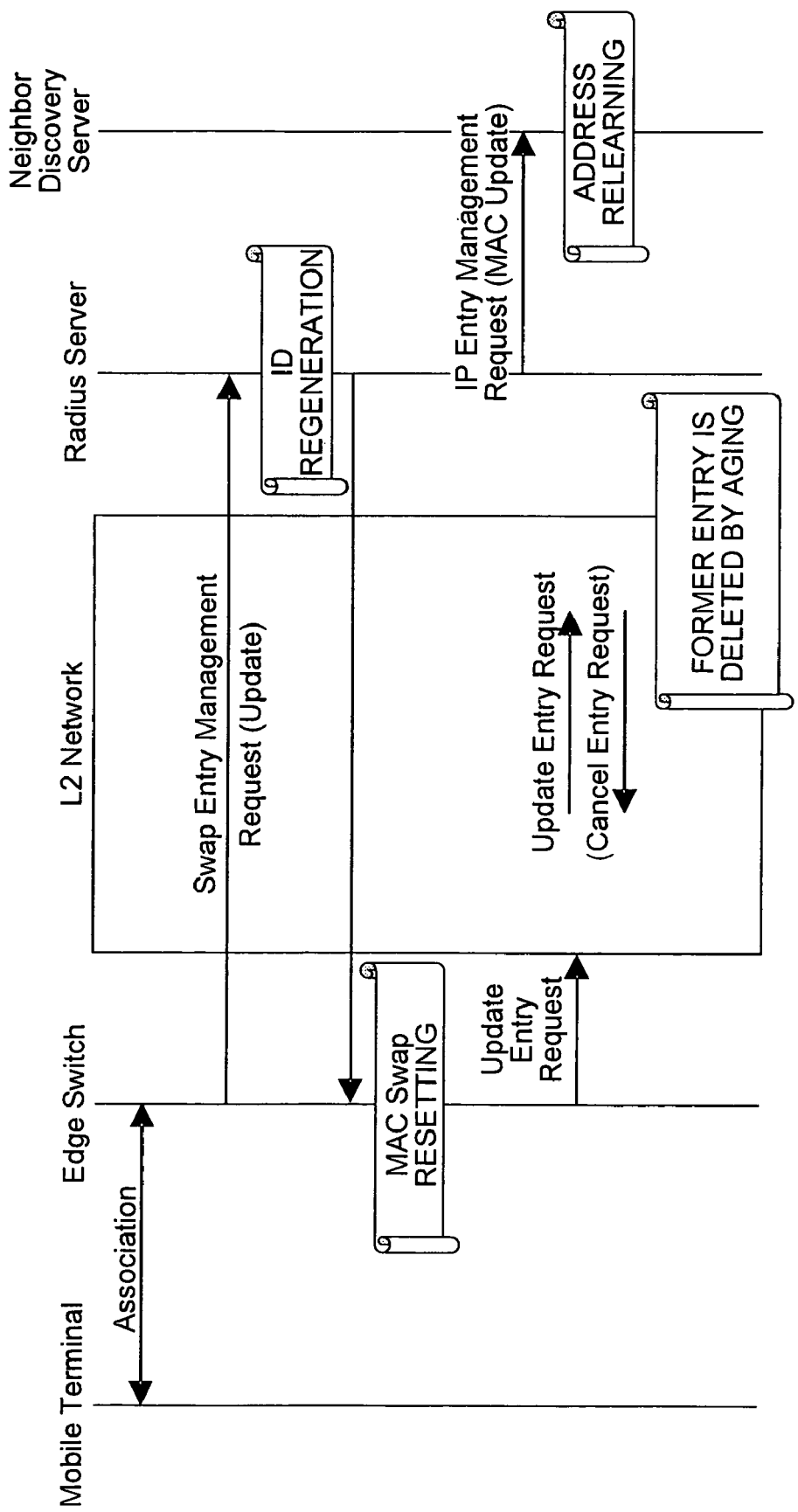
FIG. 7 is a signal flowchart of operations performed by respective constituents according to a fifth embodiment.

FIG. 7 is a flowchart of an example in which the Radius server serving as the authentication server updates the allocated temporary MAC address regularly (at predetermined time intervals).

For example, the edge switch that holds the correspondence table between the real MAC address and the temporary MAC address transmits Swap entry management request to the Radius server (temporary-MAC-address transaction server) responsible for the allocation of the temporary MAC address to request update of the temporary MAC address. The Radius server notifies the edge switch of a new temporary MAC address, and the edge switch updates the correspondence table between the real MAC address and the temporary MAC address.

To update the correspondence table between the temporary MAC address and the output port learned by each layer 2 switch in the layer 2 networks, the edge switch transmits Update Entry Request to each layer 2 switch similarly to the first embodiment. In addition, the edge switch creates a correspondence table between the new temporary MAC address and the output port for the MAC frame, which is addressed to the new temporary MAC address. The previously-created correspondence table (hereinafter "old correspondence table") is sometimes deleted by aging. The aging is a function of regarding and discarding management information as unnecessary information if no frame is transmitted and received for a certain period of time.

If an element (corresponding to Neighbor Discovery Server in FIG. 7) that manages the correspondence between the temporary MAC address and the IP address is present in the network, the Radius server or the like requests the element to update the correspondence table.

As described above, according to a fifth embodiment, the authentication server responsible for the allocation of the temporary MAC address regularly updates the temporary MAC address. It is, therefore, possible to increase security of the network against DoS attack of such a type that the temporary MAC address is picked up and is under attack.

Sixth Embodiment

Figure 8:
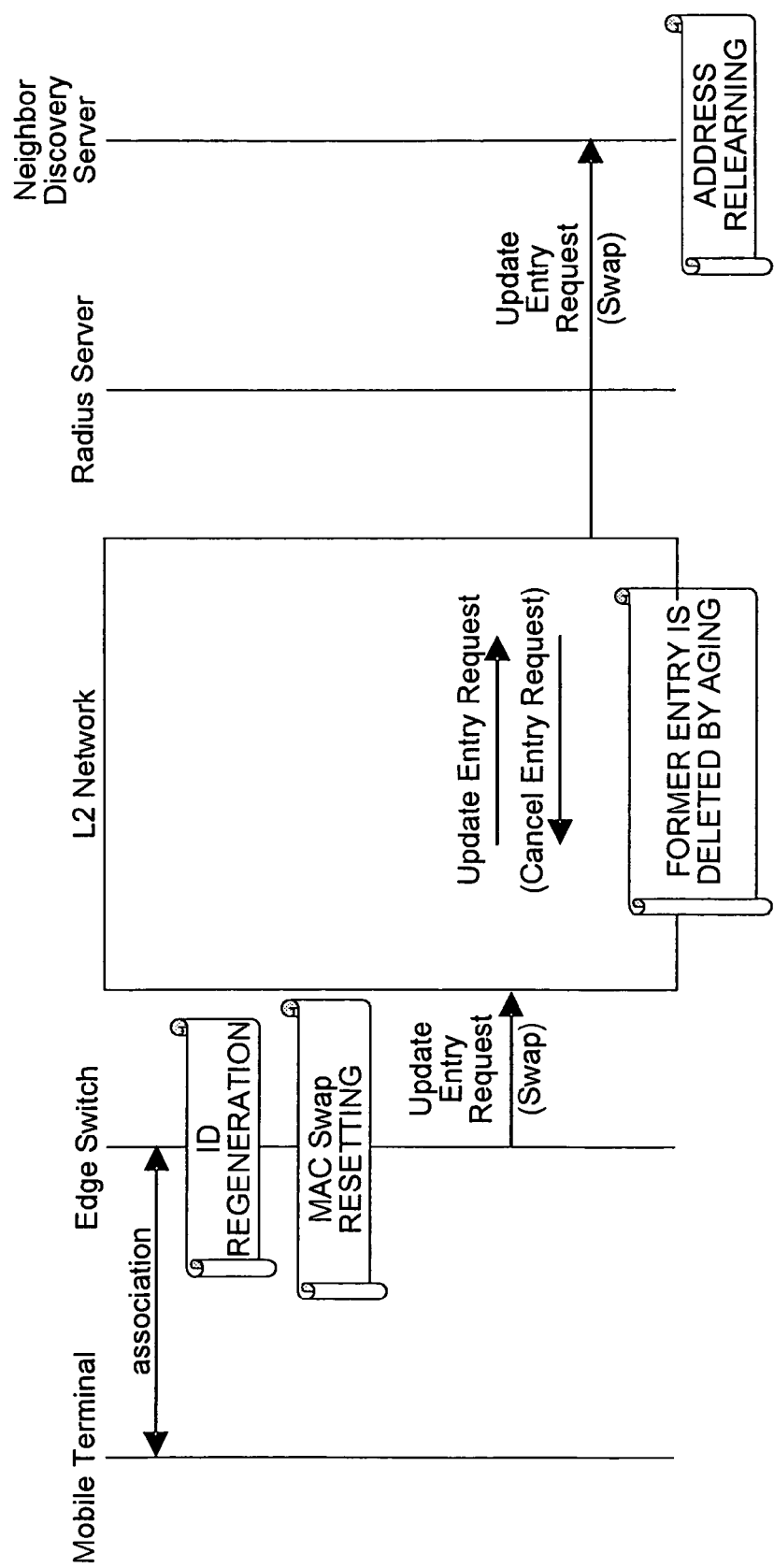
FIG. 8 is a signal flowchart of operations performed by respective constituents according to a sixth embodiment.

FIG. 8 is a flowchart of an example in which the edge switch is responsible for the allocation of the temporary MAC address (temporary-MAC-address transaction server), and regularly updates the allocated temporary MAC address.

In this case, the edge switch itself updates the temporary MAC address and, if it is necessary, notifies the Neighbor Discovery Server of the update. In the example, the new temporary MAC address and the IP address are set in Update Entry Request, and the correspondence table in the Neighbor Discovery Server is updated.

To update the correspondence table between the temporary MAC address and the output port learned by each layer 2 switch in the layer 2 networks, the edge switch transmits Update Entry Request to each layer 2 switch similarly to the first embodiment. In addition, the edge switch creates a correspondence table between the new temporary MAC address and the output port for the MAC frame, which is addressed to the new temporary MAC address. The old correspondence table is often deleted by aging.

As described above, according to a sixth embodiment, the edge switch responsible for the allocation of the temporary MAC address regularly updates the temporary MAC address. It is, therefore, possible to increase security of the network against DoS attack of such a type that the temporary MAC address is picked up and is under attack.

Seventh Embodiment

Generally, the terminal caches the correspondence table between the IP address and the temporary MAC address of the communication-partner terminal. Due to this, if the temporary MAC address is regularly updated, until the correspondence table is also updated, a MAC frame is transmitted incorrectly. The incorrect correspondence table can be corrected after a certain time through reach ability confirmation procedures according to IPv6. However, the MAC frame is transmitted to the incorrect temporary MAC address immediately after update of the temporary MAC address.

According to a seventh embodiment, therefore, the edge switch holds the old temporary MAC address for a certain period of time even after the update of the temporary MAC address. Namely, the edge switch associates the new temporary MAC address with the old temporary MAC address, and holds the old temporary MAC address for the certain period of time. If the edge switch receives the MAC frame addressed to the old temporary MAC address, the edge switch operates as if the MAC frame is addressed to the new temporary MAC address associated with the old temporary MAC address. Namely, the edge switch swaps the old temporary MAC address for the new temporary MAC address, and performs subsequent processing.

According to the seventh embodiment, it is possible to prevent the MAC frame from being discarded at the time of updating the temporary MAC address.

Eighth Embodiment

An eighth embodiment relates to an address resolution protocol for obtaining the MAC address from the IP address.

In the address resolution protocol according to the eighth embodiment, when the terminal 3a transmits a neighbor solicitation IP packet for resolution of the MAC address from the IP address, the edge switch snoops the neighbor solicitation IP packet. The neighbor solicitation IP packet includes the real MAC address and the IP address of the terminal 3a, and a target IP address, i.e., the IP address of the communication-partner terminal 3b that the terminal 3a wishes to resolve. The edge switch converts the real MAC address of the source (the real MAC address of the terminal 3a) in a MAC header of the MAC frame including the neighbor solicitation IP packet and the real MAC address of the source (the real MAC address of the terminal 3a) set in the neighbor solicitation IP packet to corresponding temporary MAC addresses based on the swap data stored therein.

When the corresponding communication-partner terminal 3b transmits a neighbor advertisement IP packet in response to the neighbor solicitation, the edge switch that accommodates the communication-partner terminal 3b snoops the neighbor advertisement IP packet. The neighbor advertisement IP packet includes the real MAC address of the terminal 3b, the real MAC address of the communication partner (terminal 3a), the IP address of the terminal 3b, and the IP address of the communication partner (terminal 3a). The edge switch converts the real MAC address of the source (the real MAC address or target MAC address of the terminal 3b) in the MAC header of the MAC frame including the neighbor advertisement IP packet and the target real MAC address (the real MAC address or target MAC address of the terminal 3b) set in the neighbor advertisement IP packet to corresponding temporary MAC addresses.

The method enables the address resolution protocol to operate correctly with the temporary MAC address.

Ninth Embodiment

Figure 9:
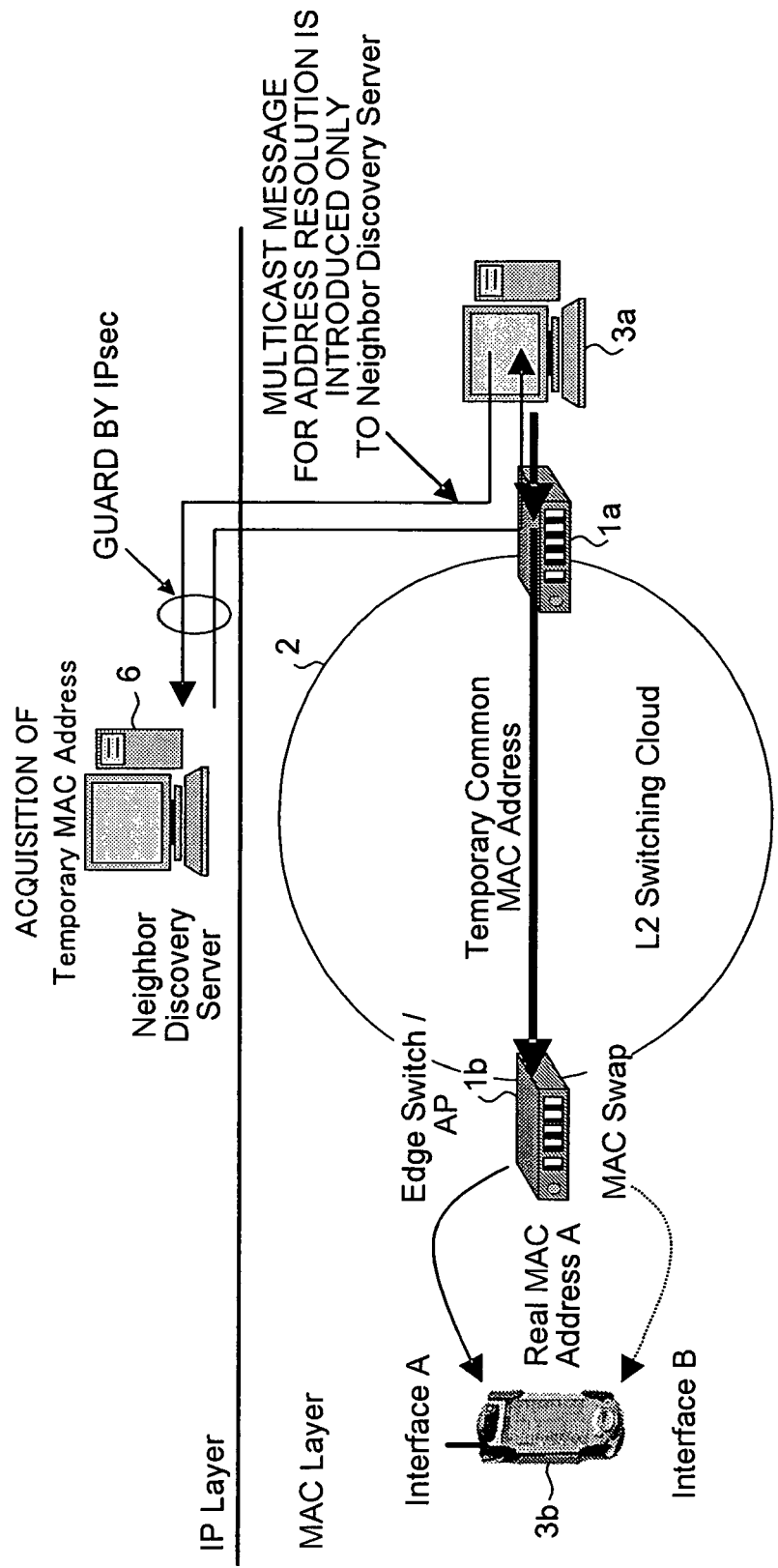
FIG. 9 is a schematic of a system configuration according to a ninth embodiment.

According to a ninth embodiment, the neighbor discovery server 6 realizes the address resolution. FIG. 9 is a schematic of a network configuration according to the ninth embodiment. If not each terminal but a neighbor discovery server 6 is responsible for the address resolution, the layer 2 network normally need not inform all the terminals of a broadcast message or a multicast message for the address resolution. Due to this, some mechanism notifies the neighbor discovery server 6 of a unicast message as a message for the address resolution.

For example, the terminal 3a transmits the neighbor solicitation IP packet including the real MAC address and the IP address of the terminal 3a, and the IP address of the communication partner (target IP address) for duplication check or resolution of the MAC address from the IP address. The neighbor discovery server 6 receives the neighbor solicitation IP packet through the edge switch 1a or the like. When receiving the neighbor solicitation IP packet from the terminal 3a, the edge switch 1a converts the real MAC address of the source in the MAC header of the MAC frame including the neighbor solicitation IP packet and the real MAC address of the source set in the neighbor solicitation IP packet to corresponding temporary MAC addresses based on the swap data stored therein.

When receiving the MAC frame including the neighbor solicitation IP packet, the Neighbor Discovery Server stores and registers a correspondence table between the temporary MAC address of the source set in the MAC header of the MAC frame and the IP address of the source set in the neighbor solicitation IP packet.

If the neighbor discovery server 6 receives the neighbor solicitation IP packet for the resolution of the MAC address from the IP packet, the neighbor discovery server 6 obtains the temporary MAC address corresponding to the target IP address set in the neighbor solicitation IP packet based on the stored and registered data. The neighbor discovery server 6 regards the temporary MAC address as the target MAC address. The neighbor discovery server 6 transmits the neighbor advertisement IP packet including the target MAC address that is the temporary MAC address, the target IP address, the temporary MAC address of the terminal (source terminal) that transmits the neighbor solicitation IP packet, and the IP address of the source terminal.

The edge switch 1a receives the neighbor advertisement IP packet. The edge switch 1a converts the destination address in the MAC header of the MAC frame including the neighbor advertisement IP packet from the temporary MAC address to the real MAC address, and transmits the real MAC address to the terminal 3a.

In the ninth embodiment, the neighbor discovery server 6 is responsible for the address resolution for the temporary MAC address. Thus, broadcast messages or multicast messages for address resolution can be reduced. Therefore, it is advantageously possible to ensure scalability for extension of the layer 2 networks.

Furthermore, because the neighbor discovery server 6 can be fixed in the system, a security association can be established by, for example, Security Architecture for the Internet Protocol (IPsec). It is, therefore, advantageously possible to safely obtain the temporary MAC address from the IP address.

Tenth Embodiment

Figure 10:
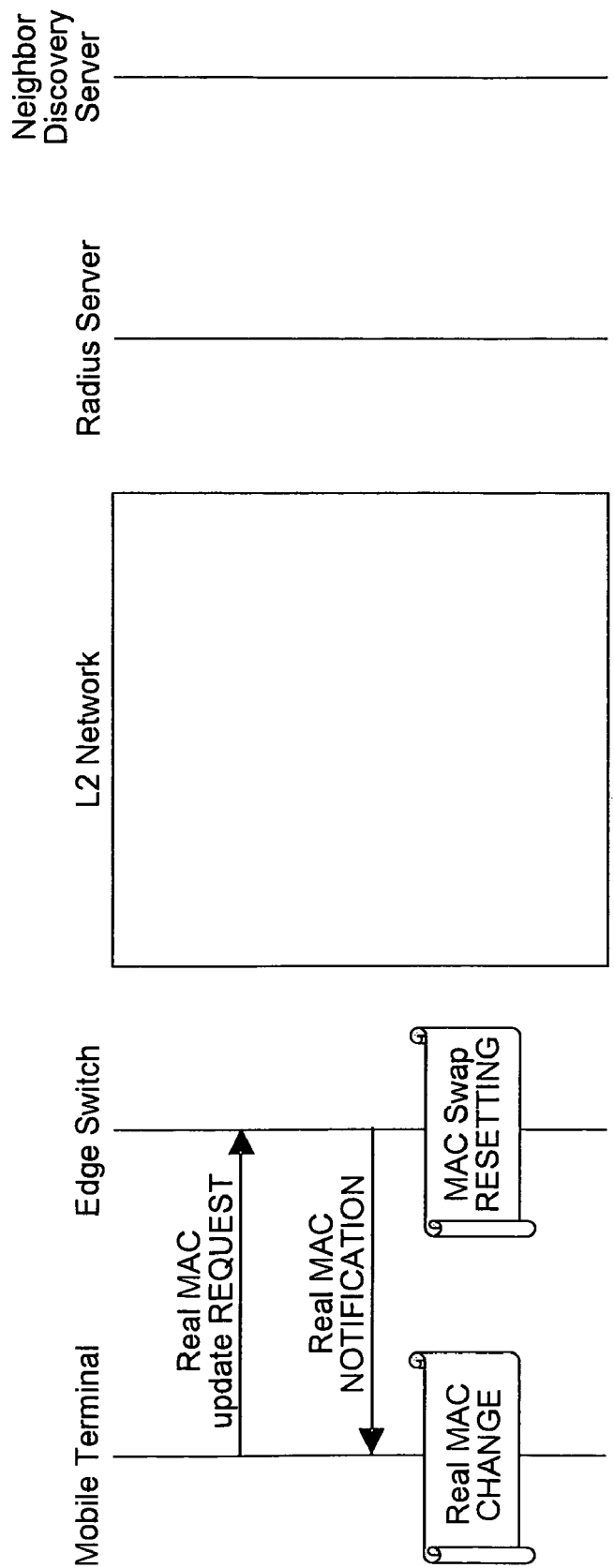
FIG. 10 is a signal flowchart of operations performed by respective constituents according to a tenth embodiment.

In a tenth embodiment, not only the temporary MAC address but also the real MAC address recognized between the terminal interface and the edge switch are changed synchronously between the terminal and the edge switch. As explained, each terminal is allocated the real MAC address per terminal interface. In the tenth embodiment, it is assumed that the terminal is capable of dynamically setting the real MAC address visible to the network. FIG. 10 is a sequence diagram for explaining an example of an update operation according to the tenth embodiment.

First, the terminal requests the edge switch to update the real MAC address (transmits Real MAC update request to the edge switch). In response to the Real MAC update request, the edge switch notifies the terminal of a new real MAC address. In this manner, the real MAC address is changed synchronously between the terminal and the edge switch.

The terminal captures the MAC frame addressed to the old real MAC address and the MAC frame addressed to the new real MAC address as frames sent thereto for a predetermined period of time. This can minimize MAC frame loss.

As described above, the terminal regularly updates not only the temporary MAC address but also the real MAC address allocated per terminal interface synchronously with the edge switch. It is, therefore, possible to increase security of the network against DoS attack of such a type that the temporary MAC address is picked up and is under attack.

Eleventh Embodiment

Figure 11:
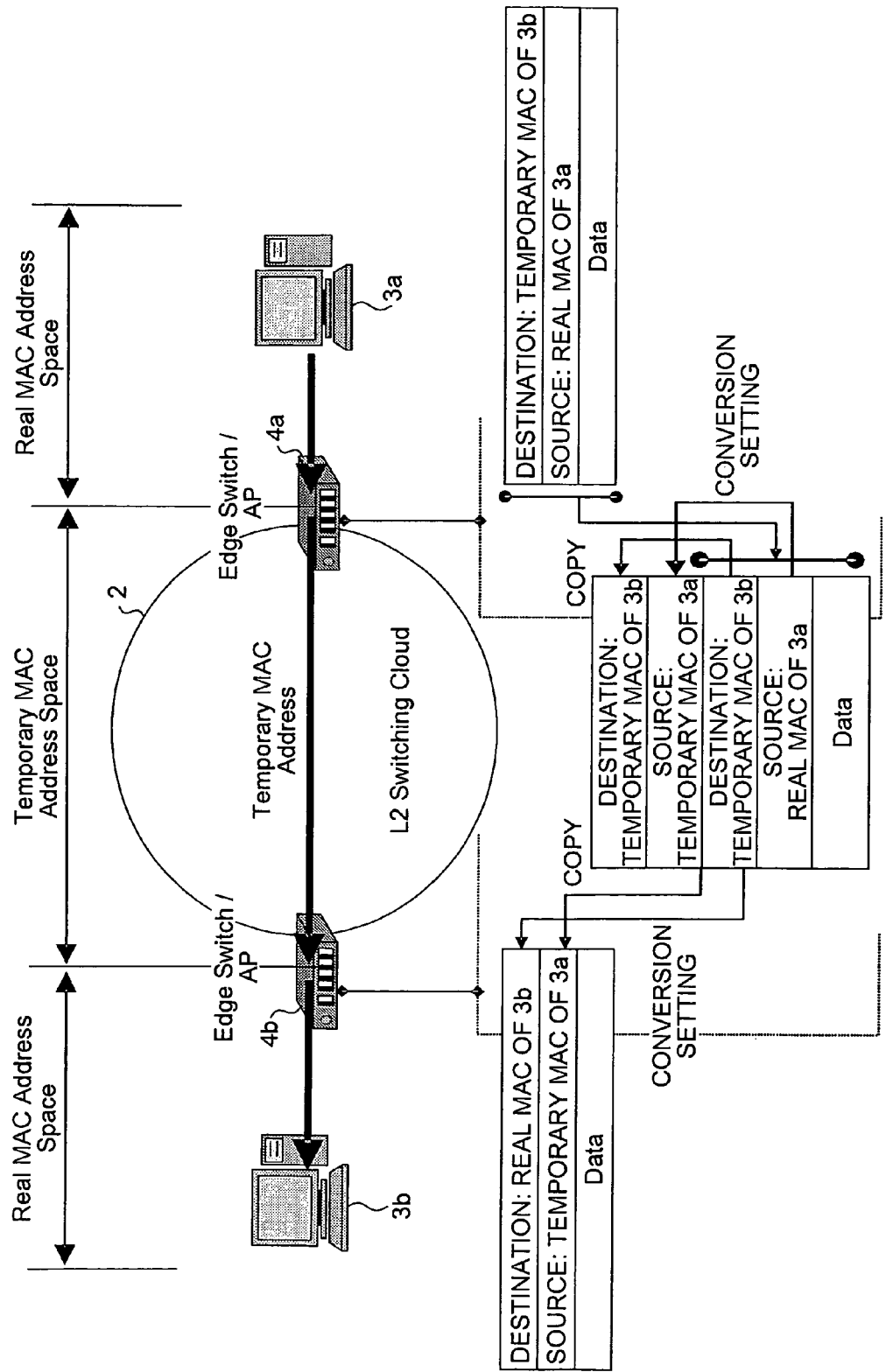
FIG. 11 is a schematic of a system configuration and a flow of the MAC frame according to an eleventh embodiment.

According to an eleventh embodiment, the edge switch uses an encapsulation technique to transmit and receive the MAC frame in the network. FIG. 11 is a conceptual schematic of the encapsulation operation.

Referring to FIG. 11, reference symbols 4a and 4b denote edge switches each performing processing characteristic of the eleventh embodiment. When the edge switch 4a receives a MAC frame from the terminal 3a, the edge switch 4a encapsulates a frame having the real MAC address of the source and the temporary MAC address of the destination, which are set in the MAC frame, with the temporary MAC address of the source and the temporary MAC address of the destination.

On the other hand, when the edge switch 4b in the network receives the MAC frame to the terminal 3b, the edge switch 4b decapsulates the MAC frame. Additionally, the edge switch 4b converts the temporary MAC address of the destination set in the MAC frame to the real MAC address of the destination, and the real MAC address of the source to the temporary MAC address of the source that has been set as encapsulation information.

According to the eleventh embodiment, the real MAC address of the source of the data is encapsulated and transmitted in the network. This encapsulation facilitates identifying a sender by MAC frame analysis, and suitably used for troubleshooting.

Twelfth Embodiment

Figure 12:
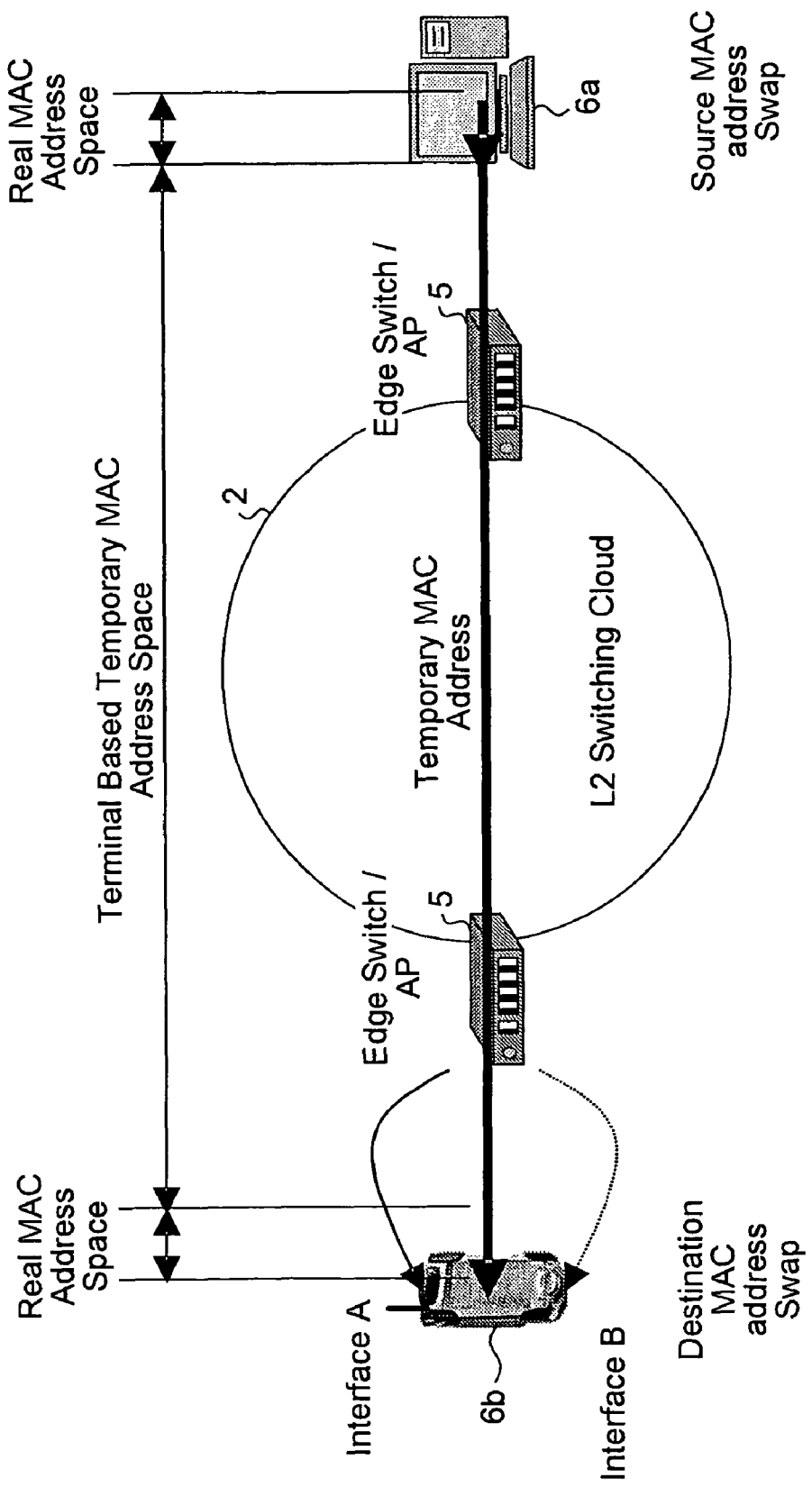
FIG. 12 is a schematic of a system configuration according to a twelfth embodiment.

FIG. 12 is a schematic of a network according to a twelfth embodiment for explaining operations performed in the network. Referring to FIG. 12, reference symbol 5 denotes a general-purpose edge switch located on an edge of the network and accommodating a plurality of wired or wireless terminals. Reference symbol 6a denotes a terminal that functions to control the temporary MAC address and transmits a MAC frame. Reference symbol 6b denotes a communication-partner terminal that functions to control the temporary MAC address and communicates with the terminal 6a. It is assumed, in particular, that the terminal 6b includes a plurality of wireless interfaces.

The communication in the network shown in FIG. 12 differs from that of the preceding embodiments in that the terminals 6a and 6b are responsible for the conversion between the real MAC address and the temporary MAC address. It appears from the network that the terminals always hold the communication using the temporary MAC addresses. Namely, the terminal converts the real MAC address to the temporary MAC address for the MAC frame to be transmitted. For the MAC frame to be received, the terminal converts the temporary MAC address to the real MAC address.

In this case, in respect of the terminal 6b, a common temporary MAC address is allocated to the interfaces. Due to this, even if the interface switching is performed, there is no change in the temporary MAC address of the terminal 6b.

Accordingly, the interface switching in the terminal 6b is invisible at all to the network, so that high-speed handover with less frame loss can be realized.

Thirteenth Embodiment

In a thirteenth embodiment, the terminal that functions to control the temporary MAC address as in the twelfth embodiment regularly updates the temporary MAC address.

Figure 13:
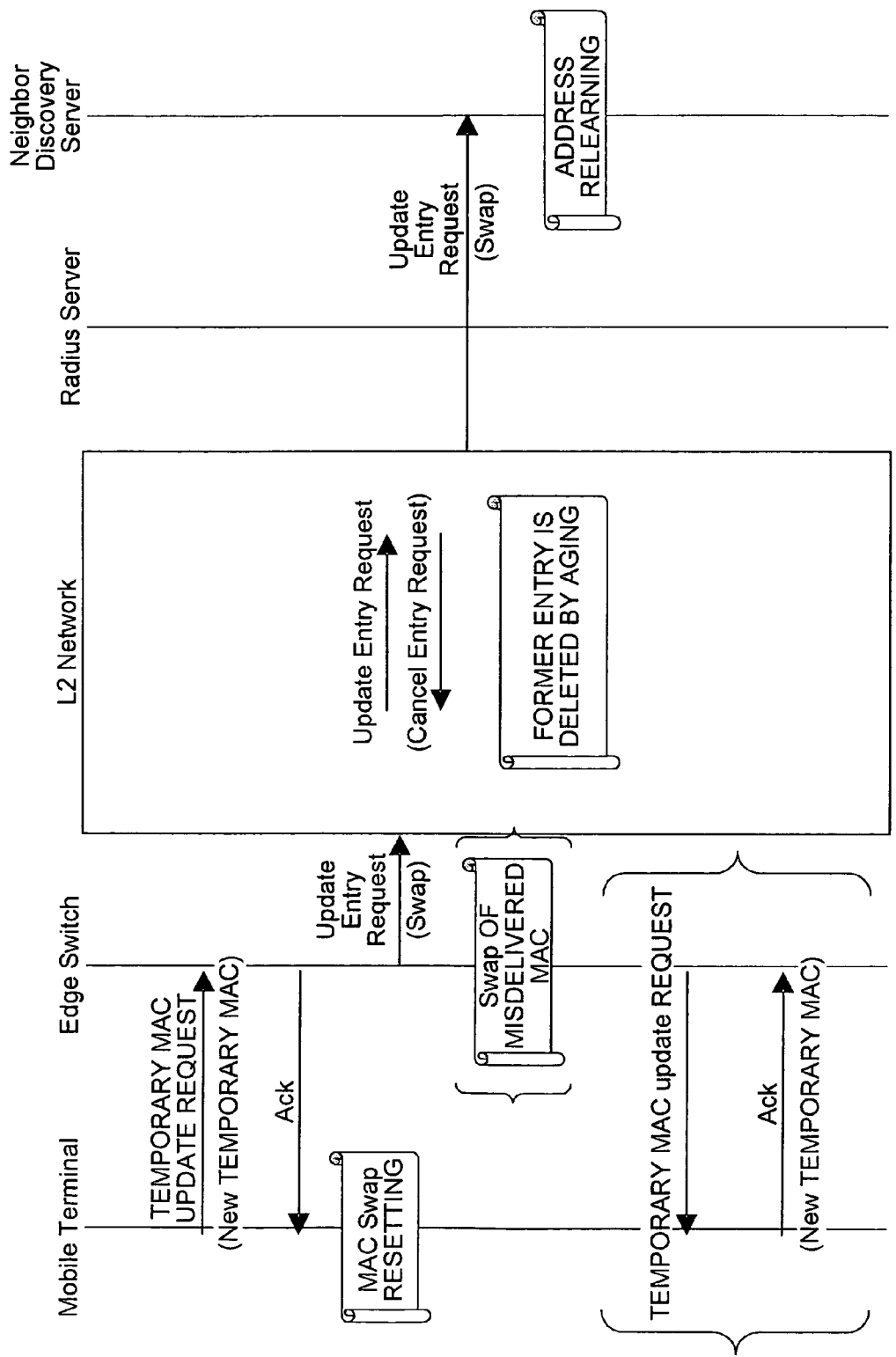
FIG. 13 is a signal flowchart of operations performed by respective constituents according to a thirteenth embodiment.

As shown in FIG. 13, if the terminal is to update the temporary MAC address, the terminal transmits an update request to the edge switch. Namely, the terminal transmits a temporary MAC update request including a new temporary MAC address to the edge switch. In response to the temporary MAC update request, the edge switch transmits a response signal Ack to the terminal. In response to the Ack, the terminal updates the temporary MAC address.

Meanwhile, the edge switch updates the swap data stored therein using the new temporary MAC address. To update the correspondence table between the temporary MAC address and the output port learned by each layer 2 switch in the layer 2 networks, the edge switch transmits Update Entry Request to each layer 2 switch similarly to the preceding embodiments. In addition, the edge switch creates the correspondence table between the new temporary MAC address and the output port for the MAC frame, which is addressed to the new temporary MAC address. The old correspondence table is often deleted by aging.

As explained in the sixth embodiment, the edge switch sets, for example, the new temporary MAC address and the IP address in the Update Entry Request, to request the neighbor discovery server to update the correspondence table based on this information.

As shown in FIG. 13, the edge switch can transmit a request for regular updating of the temporary MAC address to the terminal. In response to the request, the terminal can update the temporary MAC address.

Further, as explained in the tenth embodiment, the terminal can regularly update not only the temporary MAC address but also the real MAC address in the twelfth and thirteenth embodiments.

When the terminal regularly updates the temporary MAC address, the terminal captures the MAC frame addressed to the old temporary MAC address and the MAC frame addressed to the new temporary MAC address as MAC frames transmitted thereto for a predetermined period of time. It is thereby possible to minimize MAC frame loss.

When the terminal regularly updates the real MAC address, the terminal captures the MAC frame addressed to the old real MAC address and the MAC frame addressed to the new real MAC address as MAC frames transmitted thereto for a predetermined period of time. It is thereby possible to minimize MAC frame loss.

Besides, if the edge switch that accommodates the mobile terminal captures the MAC frame addressed to the old temporary MAC address during a predetermined period of time after the temporary MAC address is updated, the edge switch swaps the destination MAC address for the new temporary MAC address, and continues the subsequent processing. Thus, MAC frame loss can be minimized.

As set forth hereinabove, if the terminal is responsible for the allocation of the temporary MAC address, it is advantageously possible to achieve end-to-end protection against DoS attack.

INDUSTRIAL APPLICABILITY

As explained so far, the layer 2 switch networks according to the present invention is useful as a heterogeneous wireless integrated network that accommodates a mobile terminal including a plurality of types of access interfaces.

The invention claimed is:

1. A layer 2 switch network system that includes a terminal, comprising:
   a plurality of layer 2 switches including an edge switch that is located at an edge of a layer 2 switch network and serves as a wireless access point; and
   a temporary-MAC-address notifying unit that notifies the edge switch of a temporary MAC address allocated to the terminal, wherein
   the edge switch stores therein swap data which associates a temporary MAC address acquired from the temporary-MAC-address notifying unit with a real MAC address, and, based on the swap data, replaces a real MAC address of a source set in a MAC frame with a temporary MAC address of the source on receipt of the MAC frame, and replaces a temporary MAC address of a destination set in a MAC frame with a real MAC address of the destination to transmit the MAC frame the edge switch snoops a neighbor solicitation IP packet, and replaces the real MAC address of the source set in the MAC frame including the neighbor solicitation IP packet and the real MAC address of the source set in the neighbor solicitation IP packet with corresponding temporary MAC addresses, respectively, when the terminal transmits the neighbor solicitation IP packet, and
   the edge switch snoops a neighbor advertisement IP packet, and replaces the real MAC address of the source packet set in the MAC frame including the neighbor advertisement IP packet and a target real MAC address set in the neighbor advertisement IP packet with corresponding temporary MAC addresses, respectively, when receiving the neighbor advertisement IP packet from the terminal.

2. The layer 2 switch network system according to claim 1, wherein
the temporary-MAC-address notifying unit is a temporary-MAC-address transaction server that is connected to the layer 2 switch network, and generates a temporary MAC address allocated to the terminal, and
the edge switch authenticates the terminal, and, when the terminal is authenticated, acquires a temporary MAC address corresponding to the terminal from the temporary-MAC-address transaction server.

3. The layer 2 switch network system according to claim 2, wherein
the layer 2 switch network is a heterogeneous wireless integrated network that accommodates a terminal including a plurality of wireless interfaces having a common IP address, and
the temporary-MAC-address transaction server allocates a common temporary MAC address corresponding to real MAC addresses of the wireless interfaces.

4. The layer 2 switch network system according to claim 2, wherein
the temporary-MAC-address transaction server is an authentication server,
the authentication server updates the temporary MAC address at predetermined time intervals,
when updating a first temporary MAC address with a second temporary MAC address, the authentication server causes the edge switch to update the swap data, and to request a neighbor discovery server to update a correspondence table, which is stored in the neighbor discovery server, between the first temporary MAC address and an IP address to a correspondence table between the second temporary MAC address and the IP address, and
after updating the swap data, the edge switch requests the layer 2 switches to update a correspondence table, which is stored in the layer 2 switches, between the temporary MAC address and an output port for a MAC frame addressed to the temporary MAC address.

5. The layer 2 switch network system according to claim 2, wherein
the temporary-MAC-address transaction server is the edge switch, and
the edge switch updates the temporary MAC address at predetermined time intervals,
when updating a first temporary MAC address with a second temporary MAC address, the edge switch updates the swap data, and requests a neighbor discovery server to update a correspondence table, which is stored in the neighbor discovery server, between the first temporary MAC address and an IP address to a correspondence table between the second temporary MAC address and the IP address, and
the edge switch requests the layer 2 switches to update a correspondence table, which is stored in the layer 2 switches, between the temporary MAC address and an output port for a MAC frame addressed to the temporary MAC address.

6. The layer 2 switch network system according to claim 5, wherein the edge switch stores therein correspondence between the first temporary MAC address and the second temporary MAC address for a predetermined time period after updating the temporary MAC address, and swaps, when receiving a MAC frame addressed to the first temporary MAC address during the predetermined time period, the first temporary MAC address with the second temporary MAC address before processing the MAC frame.

7. The layer 2 switch network system according to claim 1, wherein
the temporary-MAC-address notifying unit is the terminal,
the terminal stores therein a temporary MAC address acquired in advance, and notifies the edge switch of the temporary MAC address when establishing an association with the edge switch, and
the edge switch acquires the temporary MAC address during an association procedure.

8. The layer 2 switch network system according to claim 7, wherein
the layer 2 switch networks is a heterogeneous wireless integrated network that accommodates a mobile terminal including a plurality of wireless interfaces having a common IP address,
the wireless interfaces are each allocated a different real MAC address corresponding to a common temporary MAC address, and
the terminal notifies the edge switch of the common temporary MAC address.

9. The layer 2 switch network system according to claim 1, wherein
when an access point of the terminal is changed from a first edge switch to a second edge switch by any one of movement of the terminal and switching of wireless interfaces used in the terminal, the first edge switch transfers swap data on the terminal stored therein to the second edge switch, and
the second edge switch stores therein the swap data.

10. The layer 2 switch network system according to claim 1, wherein, after storing therein the swap data, the edge switch requests the layer 2 switches to update a correspondence table, which is stored in each layer 2 switch, between the temporary MAC address and an output port for a MAC frame addressed to the temporary MAC address.

11. The layer 2 switch network system according to claim 1, wherein
a neighbor discovery server performs a neighbor discovery,
when receiving a neighbor solicitation M packet, the neighbor discovery server stores and registers therein a correspondence table between the temporary MAC address of the source set in the MAC frame including the neighbor solicitation IP packet and an IP address of the source set in the neighbor solicitation IP packet, and
the neighbor discovery server obtains a temporary MAC address corresponding to a target IP address set in the neighbor solicitation IP packet based on the correspondence table, and transmits a neighbor advertisement IP packet to notify the edge switch of the temporary MAC address as a target MAC address.

12. The layer 2 switch network system according to claim 1, wherein the terminal regularly updates any one of the real MAC address and the temporary MAC address or both allocated to the terminal with respect to each terminal interface synchronously with the edge switch.

13. The layer 2 switch network system according to claim 12, wherein, for a predetermined time period after updating a first MAC address with a second MAC address, the terminal captures a MAC frame addressed to the first MAC address and a MAC frame addressed to the second MAC address as a MAC frame to the terminal.

14. The layer 2 switch network system according to claim 1, wherein the edge switch encapsulates, when receiving the MAC frame containing the real MAC address of the source and the temporary MAC address of the destination, the MAC frame with encapsulation information including the temporary MAC address of the source and the temporary MAC address of the destination based on the swap data, and the edge switch decapsulates, when receiving encapsulated MAC frame, the encapsulated MAC frame, replaces the temporary MAC address of the destination set in the MAC frame with the real MAC address of the destination, and replaces the real MAC address of the source with the temporary MAC address of the source set as the encapsulation information.

15. A terminal device in a layer 2 switch network that includes a plurality of layer 2 switches including an edge switch located on an edge of the layer 2 switch network as a wireless access point, the terminal device comprising:

an interface;

a storage unit that stores therein a real MAC address and a temporary MAC address for identifying the interface;

a replacing unit that performs replacement between the real MAC address and the temporary MAC address; and a communicating unit that communicates with the layer 2 switch networks using the temporary MAC address the edge switch snoops a neighbor solicitation IP packet, and replaces the real MAC address of the source set in the MAC frame including the neighbor solicitation IP packet and the real MAC address of the source set in the neighbor solicitation IP packet with corresponding temporary MAC addresses, respectively, when the terminal transmits the neighbor solicitation IP packet, and the edge switch snoops a neighbor advertisement IP packet, and replaces the real MAC address of the source set in the MAC frame including the neighbor advertisement IP packet and a target real MAC address set in the neighbor advertisement IP packet with corresponding temporary MAC addresses, respectively, when receiving the neighbor advertisement IP packet from the terminal.

16. The terminal device according to claim 15, wherein the terminal device is a mobile terminal including a plurality of wireless interfaces having a common IP address, and the wireless interfaces are allocated a common temporary MAC address.

17. The terminal device according to claim 15, further comprising:

an updating unit that regularly updates any one of the real MAC address and the temporary MAC address or both to obtain updated MAC address; and a notifying unit that notifies the edge switch of the updated MAC address.

18. The terminal device according to claim 15, wherein, for a predetermined time period after the updating unit updates a first MAC address with a second MAC address, the terminal device captures a MAC frame addressed to the first MAC address and a MAC frame addressed to the second MAC address as a MAC frame sent thereto.

19. A layer 2 switch network system that includes the terminal device according to claim 15, wherein the edge switch regularly instructs the terminal device to change the temporary MAC address.

20. A layer 2 switch network system that includes the terminal device according to claim 17, wherein the edge switch stores therein correspondence between an old temporary MAC address and a new temporary MAC address for a predetermined time period after updating the temporary MAC address, and swaps, when receiving a MAC frame addressed to the old temporary MAC address during the predetermined time period, the old temporary MAC address with the new temporary MAC address before processing the MAC frame.

* * * * *